US008881903B2

(12) United States Patent
Vulgamott et al.

(10) Patent No.: US 8,881,903 B2
(45) Date of Patent: Nov. 11, 2014

(54) CONTAINER WITH LABELING DEVICE

(75) Inventors: Rick Vulgamott, Brighton, MI (US); Kristi Huffman, Grand Rapids, MI (US)

(73) Assignee: Multi Packaging Solutions, Inc., Lansing, MI (US)

( * ) Notice: Subject to any disclaimer, the term of this patent is extended or adjusted under 35 U.S.C. 154(b) by 64 days.

(21) Appl. No.: 13/585,887

(22) Filed: Aug. 15, 2012

(65) Prior Publication Data

US 2014/0048439 A1  Feb. 20, 2014

(51) Int. Cl.
*B65D 85/52* (2006.01)
*B65D 5/54* (2006.01)
*B65D 5/42* (2006.01)
*B65D 5/08* (2006.01)

(52) U.S. Cl.
CPC ... *B65D 5/54* (2013.01); *B65D 85/52* (2013.01); *B65D 5/4229* (2013.01); *B65D 5/08* (2013.01)
USPC .............. 206/459.5; 206/423; 40/66.7; 40/84

(58) Field of Classification Search
USPC ............. 206/423, 459.1, 459.5; 40/312, 645, 40/647; 47/65.5, 65.7, 66.7, 73–78, 84
See application file for complete search history.

(56) References Cited

U.S. PATENT DOCUMENTS

| 334,981 | A | 1/1886 | Rampe |
| 1,430,641 | A | 10/1922 | Ginn |
| 1,446,841 | A | 2/1923 | Dietsche |
| 1,557,332 | A | 10/1925 | Robbins |
| 1,840,707 | A | 1/1932 | Ensko |
| 1,896,695 | A | 2/1933 | Borovicka |
| 1,949,903 | A | 3/1934 | Fales |
| 1,984,589 | A | 12/1934 | Ludy |
| 2,192,514 | A | 3/1940 | Carleton |
| 2,554,105 | A | 4/1949 | Heinle |
| 2,669,047 | A | 2/1954 | Rieger |
| 2,721,408 | A | 10/1955 | Harris et al. |
| 3,098,320 | A | 7/1963 | Estkowski |
| 3,205,603 | A * | 9/1965 | Brumley .................... 206/459.1 |
| 3,621,809 | A | 11/1971 | Paxton |
| 3,775,882 | A | 12/1973 | Wheeler |
| D231,714 | S | 5/1974 | Authur |
| 3,946,507 | A | 3/1976 | Fergg et al. |
| 4,004,691 | A * | 1/1977 | Wihksne .................... 206/459.1 |

(Continued)

FOREIGN PATENT DOCUMENTS

| GB | 22600308 | 4/1993 |
| JP | 2003131573 | 5/2003 |
| JP | 2007104961 | 4/2007 |

OTHER PUBLICATIONS

Non Final Office Action dated Feb. 22, 2012; U.S. Appl. No. 13/155,705.

*Primary Examiner* — Bryon Gehman
(74) *Attorney, Agent, or Firm* — The Dobrusin Law Firm, PC

(57) ABSTRACT

A container including one or more labeling devices that can be detached from the container. Preferably the container can hold a plurality of different articles and includes a plurality of labeling devices for identifying the different articles. After the articles are removed from the container, the articles may be identified by the labeling devices by detaching the labeling devices and attaching or placing the labeling device on or near its corresponding article. Preferred labeling devices include one or more labeling areas that provide information regarding an article.

20 Claims, 10 Drawing Sheets

(56) References Cited

U.S. PATENT DOCUMENTS

| | | |
|---|---|---|
| D243,509 S | 3/1977 | Wheeler |
| 4,027,410 A | 6/1977 | Wheeler |
| 4,155,198 A * | 5/1979 | Kelley .................... 47/84 |
| D253,389 S | 11/1979 | South, Jr. |
| 4,190,151 A * | 2/1980 | Russell ............... 206/459.5 |
| 4,196,533 A | 4/1980 | Kamphausen |
| 4,472,896 A * | 9/1984 | Brauner et al. ........ 206/459.1 |
| D311,215 S | 10/1990 | Hickmott |
| 4,972,616 A | 11/1990 | Doll |
| D314,493 S | 2/1991 | Keane |
| 5,438,796 A * | 8/1995 | Nathan .................. 47/66.6 |
| 5,575,107 A * | 11/1996 | Doerr .................... 206/423 |
| D393,660 S | 4/1998 | Gibson |
| D398,639 S | 9/1998 | Merrick |
| D402,863 S | 12/1998 | Hickmott |
| D427,639 S | 7/2000 | Hickmott |
| D428,445 S | 7/2000 | Hickmott |
| D437,618 S | 2/2001 | Faulkner |
| 6,199,319 B1 * | 3/2001 | Skinner .................. 40/645 |
| D443,310 S | 6/2001 | Faulkner |
| 6,401,375 B1 | 6/2002 | Hickmott |
| D520,065 S | 5/2006 | Doyle |
| 7,073,282 B2 | 7/2006 | Savagian et al. |
| 7,263,794 B2 | 9/2007 | Gilbertie |
| D609,277 S | 2/2010 | Gibson et al. |
| D662,989 S | 7/2012 | Vulgamott |
| 8,240,073 B1 | 8/2012 | Vulgamott et al. |
| 8,429,842 B2 | 4/2013 | Vulgamott et al. |
| 2005/0223640 A1 | 10/2005 | Hall et al. |
| 2009/0031597 A1 | 2/2009 | Powell et al. |

* cited by examiner

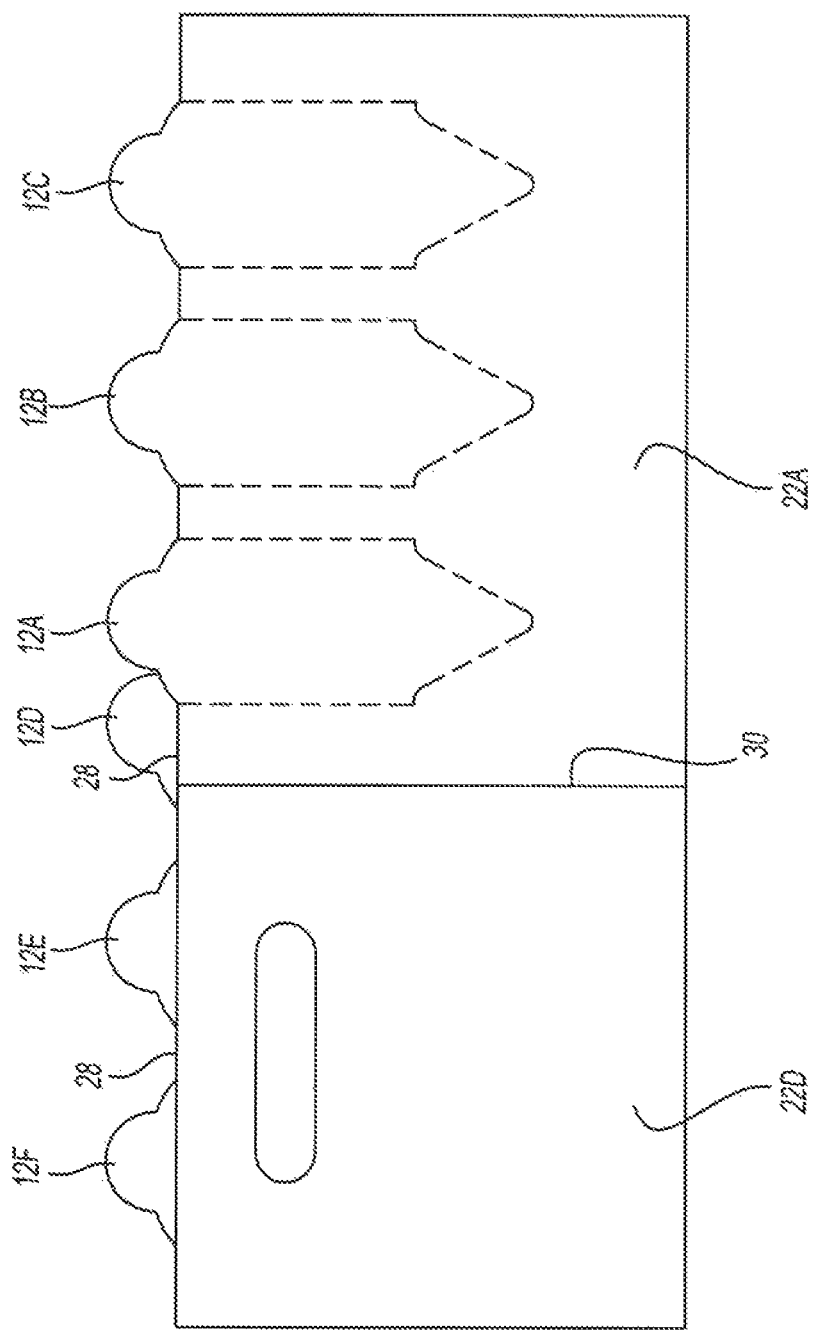

CONTAINER WITH LABELING DEVICE

FIELD OF THE INVENTION

The present invention relates to blanks for a container, methods of assembly, uses of a container, and methods of using the container. In particular, the present invention relates to containers having one or more labeling devices that are detachable from the container. Preferably, the labeling device is integrated into the container.

BACKGROUND OF THE INVENTION

There is an ongoing need in the field of packaging for a container (e.g., a tray that may optionally include a lid) configured for functioning as a tray for display and/or containment of an article, such as a consumer product. There is an ongoing need for an alternative container that is capable of being printed on one or both sides of any paperboard used for nicking the product (e.g., by pixelated type printing, such as ink-jet, laser jet or other suitable printing devices, by screen printing, or other printing). There is also an ongoing need for a container that can be made from a single sheet of stock material, such as a paperboard material. There is also an ongoing need for a container that is capable of supporting loads from one or more contained articles, without buckling or otherwise plastically deforming from the load of the one or more contained articles.

In many applications, containers are used for holding articles temporarily. When the article is removed from the container, there may be a need to identify the article. One approach to identifying an article is to use a separate label and to place the label on the container, in the container, or near the article in the container. However, such a label may fall of, or otherwise become separated from the container, separated from the article, or both.

Examples of an article with a separate label is described in U.S. patent application Ser. No. 13/155,705 filed on Jun. 8, 2011 by Vulgamott et al., incorporated herein by reference in its entirety.

There are also applications that could benefit by placing a plurality of different articles into the same container and require a means of distinguishing the different articles when they are removed from the container. The ability to distinguish different articles after removing them from a container may be particularly difficult when the articles have similar appearance or when specific information about the article is required. Instead, articles that are the same are often packaged together in the same container so that there is no need to distinguish between the articles. Although this may be useful when a plurality of identical articles are desired, there are problems with distinguishing articles when different articles are desired to be packaged together.

There is a need to solve these problems for identification of a single article after being removed from a container and/or for distinguishing between two or more different articles after being removed from a container.

SUMMARY OF THE INVENTION

One or more of the above needs are met by the teachings herein.

One aspect of the invention is directed at a container (i.e., a primary container) for holding one or more articles comprising: a base; and one or more generally vertical side walls suitable for maintaining at least a portion of the one or more articles within the container for a period of time; wherein the container includes one or more labeling devices, wherein the labeling device is detachable from the container so that some or all of the labeling device can be attached to or positioned near the article when the article is removed from the container.

This aspect of the invention may be characterized by one or any combination of the wing features: the base is suitable for supporting the one or more articles, the container includes four side walls, or both; the container includes a plurality of labeling devices; the labeling devices includes a first labeling device and a second labeling device that is different from the first labeling device, so that the labeling devices can be used for articles that are different; the labeling device includes a securing feature suitable for attaching the labeling device to one of the articles or near one of the articles (preferably without the need for any additional adhesive and/or without the need for any additional fastener); the container is constructed from a continuous single sheet (e.g., a single blank) having a first face and an opposing second face; one or both of the first face or the second face is adapted for printing directly on its surface; the container includes one or more perforations, one or more slits, one or more scores, or any combination thereof, for detaching the labeling device; the labeling device is sufficiently rigid and includes a taper (e.g., so that the labeling device can be planted in a particulate substrate, such as for placing in soil or other material suitable for a plant root); the labeling device includes information about an article; the labeling device and/or another region of the container includes information for identifying for which article the labeling device is intended; the labeling device includes an identifier (such as a coloring, a symbol, a character, a graphic, a banding, a code, or any combination thereof) that matches with an identifier on the article; the container is suitable for holding a plurality of articles; the container includes a) a generally rectangular base (i.e., base portion) having a first pair of peripheral edges and a second pair of peripheral edges, b) to first pair of opposing spaced apart side walls each projecting generally orthogonally from respective edges of the first pair of peripheral edges, and c) a second pair of opposing spaced apart side walls each projecting generally orthogonally from respective edges of the second pair of peripheral edges; wherein the intersections of the base with two orthogonal walls define four corners of the container; the base portion and the site walls are constructed from a continuous single sheet, the base (i.e., the base portion) includes two or more layers of the single sheet that are folded from the continuous single sheet; the one or more walls of the container is constructed from a material that is recyclable, biodegradable, coated, or any combination thereof; the one or more walls of the container is constructed from a material that does not degrade between a time of planting and a time of harvesting; one or more labeling device is located on a side wall (i.e., an upright wall or a vertical wall) of the container; the container includes different labeling devices for distinguish articles that otherwise are generally difficult to distinguish (e.g., different varieties of the same species of plants); the container includes labeling devices on different walls of the container; the container includes perforations for detaching the labeling device from the container; the container includes two or more base layers that are folded from a continuous single sheet and one or more base layer spans substantially the entirety (e.g., 70% by area or more, 80% by area or more, 90% by area or more, or 95% by area or more) of the area of the base; each side wall has a periphery including a bottom periphery and a base layer or a base support layer is connected with each bottom periphery; the base portion includes base openings so that a liquid can drain from the inside of the container, through the base opening to as location exterior of the container; the container includes adhesive bonds for attaching two adjacent base portions that meet at a corner of the container; or two or more of the side walls include openings sufficient for handholds for carrying the container.

Another aspect of the invention is directed at a package including a container according to the teachings herein, and one or more articles in the containers.

This aspect of the invention may be further characterized by one or any combination of the following features: the container holds a plurality of articles that are different; the package includes two or more articles, wherein the articles are arranged in the container so that each article is associated with a labeling device; or the two or more articles are different varieties of a plant of the same species.

Another aspect of the invention is directed at a process of using a container according to the teachings herein, wherein the process includes a step of detaching the labeling device from the container.

Yet another aspect of the invention is directed at a die cut perform (e.g., a paperboard perform) suitable for container according to the teachings herein.

This aspect of the invention may be characterized by one or any combination of the following features: the preform (e.g., the paperboard) has a thickness of about 2 mm or less; or the perform includes one or more features of the figures;

A further aspect of the invention is directed at a method of making a container, comprising folding a die cut perform according to the teachings herein for making a container.

Another aspect of the invention is directed at a kit comprising; a container according to teachings herein, and one or more articles.

This aspect of the invention can be further characterized by one or any combination of the following features: the one or more articles are at least partially located in the container; a labeling device of the container describes one or more features of the article; the kit includes a plurality of articles; the container includes a plurality of labeling devices; the kit includes a plurality of articles including a first article and a second article that are different; the container includes a plurality of labeling devices including a first labeling device that describes one or more features of the first article and a second labeling device that describes one or more features of the second article; the first labeling device and the second labeling device are different; or the first article is positioned so that the first article is associated with the first labeling device and the second article is positioned so that the second article is associated with the second labeling device.

BRIEF DESCRIPTION OF DRAWINGS

FIG. 17 is a drawing of a container according to the teachings herein, where the container has been collapsed so that it generally lies in a flat configuration.

DETAILED DESCRIPTION

Figure 1A:
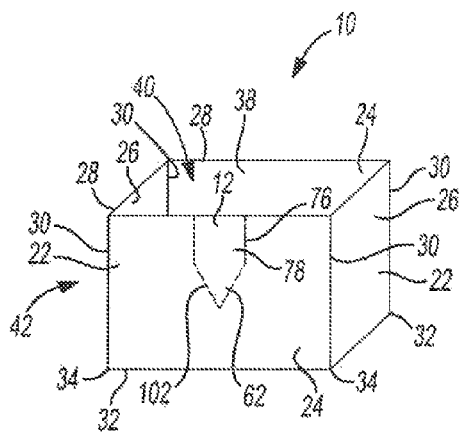
FIG. 1A is a perspective drawing of an illustrative container according to the teachings herein having one or more detachable labeling devices.

The teachings herein contemplate the structures and features depicted in the accompanying drawings. Variations to the structures and features are also contemplated within the teachings. For example, any dimensions, angles, tolerances and/or proportions shown in the drawings are part of the teachings herein. Departures from the dimensions, angles, tolerances and/or relative proportions shown in the drawings are part of the teachings herein to the extent that such variations do not materially affect the intended operation or functionality of the depicted structures and features. For example, variations in an amount of less than 50%, 30% or 10% are envisioned; variations in an amount of more than 50%, 30% or 10% are also envisioned.

Unless otherwise stated or reasonably apparent from the context of the teachings, geometries may vary from those depicted in the drawings. Sharp corners at free ends of the structures may be rounded. Rounded corners at free ends of structures may be sharp.

Perforations depicted in the drawings may be located generally as shown. Additional perforations may be added. Perforations may be omitted. They may be located intermittently substantially entirely along a crease. They may be located along only a portion of a crease (e.g., a total length of slit material being less than about 60%, 40%, 20%, 10% or less).

Containers are often used for holding, storing and/or transporting articles that have features or characteristics that may need to be identified following a step of removing the article from the container. When the article is removed from the container, it may be desirable to label the article or place a label near the article so that the article and/or one or more features of the article can be identified or to provide information related to the article. Such a label may be particularly advantageous when there is a plurality of different articles in the container and/or the article typically does not include labels or other identifiers. For example, food products, plants, minerals, and the like, may be packaged in a container that identifies the items, but may be more difficult to identify after being removed from the container. Other articles, such as pills (e.g., medications, vitamins, supplements), flags, and the like, may have markings that identify the article but may be difficult for an unskilled person to readily identify. By including detachable labeling device to a container, it is now possible to easily identify an article following a step of removing the article from the container. When the article is removed, the labeling device can be detached from the container and either attached to the article, or positioned near the article. The attaching of the labeling device to the article may include attaching the labeling device directly to the article or attaching the labeling device indirectly to the article, such as by attaching the labeling device to a secondary container or compartment that holds the article. After detaching the labeling device and removing the article from the container, the labeling device and the article, the distance between the labeling device and the article may be generally short, such as about 5 m or less, about 1 m or less, about 0.5 m or less, about 0.2 m or less, about 0.1 m or less, about 50 mm or less, or about 25 mm or less. For example, the distance between the labeling device and the article may be about 0 mm or more, or about 10 mm or more. The time that the detached labeling device remains within a generally short distance of the article may be generally long. After detaching the labeling device and removing the article from the container, the labeling device and the article may be within a generally snort distance for a time of about 5 minutes or more, about 5 hours or more about 1 day or more, about 7 days or more, about 30 days or more, or about 60 days or more. The detached labeling device and the article removed from the container may remain within a generally short distance for less than about one year; however, longer times are also contemplated. For example, a labeling device that remain permanently near or attached to (e.g., affixed to) an article is also contemplated.

The labeling device may have one or more labeling areas. A labeling area may be employed for printing information related to the article. The one or more labeling areas may all be on one surface of the labeling device, or the labeling device may have one or more labeling areas on a first surface and one or more labeling areas on a second surface. A labeling area may include information that is printed, embossed, stamped, or any combination thereof. The information in a labeling area may include graphical information, information in text, information in symbols, or any combination thereof. A labeling area may include information that is specific to an article, information that is general to a group of articles, information identifying a manufacturer, supplier, or retailer, or any combination thereof.

The labeling device preferably has one or more securing features (e.g., one or more attachment feature). A securing may include one or more feature suitable for securing the labeling device directly to the article, one or more attachment features suitable for securing the labeling device indirectly to the article, one or more attachment features suitable for securing the labeling device to a location near the article (e.g., after the article has been removed from the container), or any combination thereof.

An securing feature may function by penetrating a surface, such as a surface near the article. For example, a securing feature may include a generally pointed end. A securing feature that penetrates a surface may be used for positioning the labeling device so that at least a portion of the securing feature is inserted into the substrate and one or more labeling areas are out of the substrate and visible. The substrate may include, consist essentially of, or consist entirely of soil, mulch, clay, pebbles, sand, other materials suitable for growing plants, or any combination thereof.

A securing feature may function by clipping directly or indirectly onto an article. For example, the securing feature may have a plurality of protrusions. It will be appreciated that a plurality of protrusions may be employed for attaching the labeling device (after detachment from the container) to a wall having opposing surfaces so that at least one protrusion sits on either side of the flat region (e.g., a flat region of the article or a flat region near the article). By way of example, the securing feature may include an inner section and an outer loop section, such as the loops of a paper clip. The securing feature may have three or more protrusions including, a central protrusion for positioning on one surface of a flat region which is interposed between two outer protrusion for positioning on the opposing surface of the flat region.

A securing feature may function by tagging the article, tagging an object near the article, or tagging an object that is attached to the article. For example, a securing feature may function by encircling a portion of the article. For purposes of illustration, the article may be a plant and the securing feature may encircle a stem, branch, or trunk of the article. A securing feature that functions by tagging the article may have an opening for receiving a portion of the article. The securing feature preferably includes one or more slits, and most preferably a single slit, extending from an opening of the labeling device to a periphery of the labeling device. Such a slit may allow, an object to be tagged (such as a portion of the article or an object connected to or near the article), by allowing access to the opening of the labeling device. Alternatively, the securing feature may include two spaced apart sections that knot together, twist together, snap together, adhere together, or otherwise can be attached so that an opening (e.g., a ringed opening) is formed.

The detachable labeling device is preferably integrated with or otherwise attached to the container. The labeling device may be integrated with a container lid, a container tray, or both. For example, the detachable labeling device may be formed from the same blank as one or more components (e.g., upright wall, base layer, lid, or any combination thereof) of the container.

The labeling device may be part of a blank that forms one or more walls of the container. Before detaching the labeling device, the labeling device may be part of a wall. For example, a wall of the container may include a first region that is a labeling device and a second region that is not a labeling device. The labeling, device may have one or more connecting edges that connect with the second region. A connecting edge of the first region may include, consist essentially of, or consist entirely of one or more perforations, one or more slits, one or more scores, or any combination thereof. The connecting edge is preferably has a sufficient number of slits, scores, or perforations so that the first region is easily detachable from the second region. The connecting edge preferably sufficiently attaches the labeling device to the balance of a component so that the integrity of the component is maintained during storage, transport, or handling of the container with one, or more articles. For example, the labeling device should not separate from the container until it is desired to remove the labeling device, until it is desired to remove the article, or both. The perforations, slits, or scores preferably allows for separation of the labeling device along a predetermined path. For example, the labeling device may be detachable without tearing the labeling device, without tearing a component of the container, or both.

A container having a plurality of labeling devices may have an upright wall that includes a plurality of labeling devices, may have adjacent walls each having one or more labeling device, may have opposing walls each having one or more labeling device, or any combination thereof.

One or more, or even all of the labeling devices of a container may be located on a single upright wall, on two opposing upright walls, on two adjoining upright walls, on three or more different walls, on a base, on a lid, or any combination thereof.

In addition to the detachable labeling device, the container may include one or more additional detachable components, such as a component that is not intended to remain with the article to be carried in the container. For example, the container may include a detachable information card. Such a card may have any shape and configuration. By way of example, a detachable information card may include one or more recipes related to the article, one or more recommendations related to the article (such as a recommendation for using the article), or both.

The container preferably is formed from one or more blanks. For example, two to adjacent side walls of the container may be formed from a single blank.

The container includes a base that preferably is sufficiently strong so that it can support one or more articles in the container. The base may include one or more base layers. The base preferably includes a plurality of layers. One or more layers of the base (e.g., each layer of the base) may have an edge that is connected to a side wall of the container. Base layers generally have two, opposing faces. A face of one base layer may be adhesively attached to a face of an adjacent base layer.

A base layer may cover the entire base or a portion of the base. For example, base may include one, two or more base layers having a face with an area wherein the ratio of the area of the face to the area of the base is about 0.5 or more, about 0.8 or more, about 0.7 or more, about 0.8 or more, or about 0.9 or more.

A base layer may include a first set of too base layers that extend from the bottom edges of adjacent side walls and a second set of two base layers that extend from the bottom edges of two different adjacent side walls.

The base may include one or more openings so that liquid can easily drain out of the base. An opening may be located in any location of the base. For example, an opening may be located near a corner of the base, near an edge of the base, near the center of the base, or any combination thereof. It may be desirable to have an opening near each corner of the base so that a liquid can drain from the container independent of any tilting of the container.

The base may include a first base layer having one or more openings (i.e., base openings) including first opening and a second base layer having one or more openings including the first opening, wherein the first openings of the two base layers are openings are corresponding openings. The total size (e.g., the total cross-sectional area) of the base openings preferably is sufficiently small so that the ability of the base to support the articles is not hampered. For example, the ratio of the total area of base openings to the area if the surface of the base may be about 30% or less, about 20% or less, about 10% or less, or about 5% or less.

The labeling device may have any size suitable for labeling the article after it is removed from the container. It may be desirable for the container to be suitable for holding, transporting, or storing one or more articles after one or more, or even all of the labeling devices are removed. As such, it may be desirable that each side wall (e.g., each upright wall) of the container have labeling devices that contribute to about 50% or less, about 40% or less, about 30% or less, or about 20% or less of the total area of the side wall.

In other applications, a container may no longer be used for transporting articles after one of the labeling devices is removed Containers and labeling devices according to the t teachings herein may be employed in a process including a step of removing one or more articles from the container. The process may include a step of detaching one or more labeling devices from the container. The process may include a step of placing a labeling device near or on an article or attaching the labeling device to an article. For example, a detached labeling device may be placed near or on an article that has been removed from the container. As another example, a detached labeling device may be attached to an article that has been removed from the container.

When plants are put in a container for replanting, traditionally all of the plants in a container are of the same variety or are easily distinguished. For example, some plants are easily distinguishable from one or more inherent features of the plant. When similar appearing plants, such as similar appearing varieties of a single species) have been placed in a common container, it has been traditional to distinguish the plants by a tag placed on the plant, by a label or marking placed on the plant, by using separately labeled pots, or by placing a label in the soil or other substrate near the plant. A container according to the teachings herein may obviate the need for any of these methods for distinguishing similar appearing articles. Instead the plants may be distinguished from each other by their arrangement in the container relative to portions of the container that are detachable and usable as labeling devices when the plant is removed from the container. It will be appreciated that such an approach may be taken for other articles other than plants.

A container having a portion that is a labeling device may also be useful for containers with a single article, or with a plurality of identical article. Here, the labeling device may be employed for labeling the article after the article is removed from the container. For example, the labeling device may be detached from the container and attached to the article or positioned in the proximity of the article. Such a labeling device could be used for identifying the article and/or identifying a feature of the article at a later time.

It will be appreciated that a container having a plurality of labeling devices may also be useful for containers having a plurality of easily distinguishable articles, but where the identity of the articles may be difficult to determine by an ordinary person. For example, the container may include a set of flags (e.g., flags from a plurality of countries, flags from a plurality of states, maritime flags, historical flags, etc.). Here, the labeling devices may assist an ordinary person in identifying the individual articles (e.g., an individual flag), particularly when the article is removed from the container and each labeling device is attached to or positioned near an article. There are many other sets of articles which can be readily determined as being different, but may be difficult to identify, name, or describe its characteristics.

The labeling device may have a securing feature for planting or otherwise placing the labeling device in the ground or other substrate near the article being labeled. As such, the labeling device may include one or more features that facilitate its placement in the ground. For example, the labeling device may be sufficiently rigid so that it can be pushed into a particulate substrate, such as a soil substrate. The labeling device may be sufficiently rigid so that when a portion of the labeling device is in a particulate substrate, another portion of the labeling device stands in a generally vertical or erect orientation. Rigidity may be provided by a material having as high modulus, by a material that is generally thick, by the use of ridges or other stiffening features, and the like. The labeling device may also have a shape that facilitates its placement in the ground. For example, the labeling deviced may have an end that is tapered or generally narrow, so that it can easily penetrate the particulate substrate.

The container typically is capable of at least partially containing one or more articles. For example a portion of an article may be positioned in the container and as portion of an article may be positioned outside of the container. For purposes of illustration, the container may suitable for holding a plant where a portion of the root is positioned within the container and one or more leaves are partially or entirely located outside of the container. One or more articles may be located substantially entirely or completely entirely within the container.

The container may be a closed container or a container having one or more openings. An opening in the container may be employed to facilitate the removal of one or more articles from the container. For example, the container may have one or more openings in a side wall or in a top of the container. The container may be free of a top. For example the container may only have a base and side walls. Such a container may be characterized as being free of a lid and/or consisting of a tray. A container that is closed may have a lid. The lid may be a separate component or the lid may be integrated with one or more side walls of the container. A lid that is separate may be configured to fit over a tray. For example, a lid may include a too portion having a sufficient size to cover a tray and one or more generally vertical side walls.

Material

The container and/or a blank for the container may be made of any material that allows the container to be used for holding one or more articles, allows for the removal of a detachable label, or both. The container and/or the blank for the container may be made of a flexible material. The container and/or the blank for the container may be made of a cuttable material. The container and/or the blank for the container may be made of a rippable material. The container may be made of a material that may be slit, cut, perforated, scored, creased, or a combination thereof. The container and/or the blank for the container may be made of any material that May be die cut. The container and/or the blank for the container may be made of a recyclable material. The container and/or the blank for the container may be made of a biodegradable material. The container and/or the blank for the container may be made of paper, plastic, metal, cardboard, coated paperboard or a combination thereof. The container and/or the blank for the container may be made of any material that, may be coated, painted, printed, adhered to, or a combination thereof. The container and/or the blank for the container may include a portion that may be written on so that notes may be written on the container. The portion that may be written on may include a coating so that that the writing may be wiped off and more writing may be applied. The container and/or the blank for the container may include waterproofing. The container and/or the blank for the container may be washed and reused.

A container according to the teachings herein may include one or any combination of the features of illustrated in FIG. 1A. FIG. 1A is a perspective drawing of a container capable of holding one or more articles. The container may have a base (not shown) including one or more base layers. The container may include a plurality of side walls 22, such as side walls that are generally upright. The upright side walls may be generally parallel to the vertical direction. The container may include a first pair of opposing side walls 24. The container may include a second pair of opposing side walls 26. The container may have a peripheral edge 28. The peripheral edge may run a portion of, or the entirety of the container top of the container, such as illustrated in FIG. 1A. Two adjacent side walls 22 may have a common upright edge 30. For example, two adjacent side walls 22 may be attached along an upright edge or two adjacent side walls may be formed of a single blank that is bent along a common upright edge 30. A side wall may include a horizontal edge 32. A side wall 22 may share some of, or all of a horizontal edge with the base (e.g., a base layer) of the container 10. For example, a side wall 22 and a base layer may have a common horizontal edge 32 where the base layer is attached to the side wall 22. A side wall 22 and a base layer may be formed of a single blank that is bent along the common horizontal edge 32. The container 10 may include one or more corners 34. For example, two adjacent side walls 22 and a base layer may meet at corner 34. The container 10 generally includes one or more detachable labeling devices 12. A labeling device may be located on any portion of the container. For example, the container may include one or more detachable labeling devices on a side wall 22. If the container 10 includes a plurality of detachable labeling devices 12, they may be located on a single wall 22, or may be, located in different portions of the container 10. For example, a first detachable labeling device 12 may be located on a first wall 22, and another detachable labeling device 12 may be located on an adjacent wall, on an opposing wall, or both. The detachable labeling devices 12 may all be located on two opposing side walls 24, 26. The container may have a top that is covered or that is uncovered. FIG. 1 illustrates a container having a top that is uncovered 38. The container may define one or more interior regions 40 inside the container 10 rid one or more exterior regions 42 located outside of the container 10. The detachable labeling device 12 preferably includes one or more securing features 62. A securing feature 62 may be used for securing the labeling device 12 directly to an article 14, for securing the labeling device 12 indirectly to an article 14, for securing the labeling device 12 in a position near the article 14, or any combination thereof. As illustrated in FIG. 1A, the securing feature 62 may include a tapered tip 102. The tapered tip 102 may be configured for inserting at least a portion of the attachment feature 62 into a substrate 110. The container may include one or more detachment features 76 for enabling the detachment of the detachable labeling device from the container. For example, one or more edges of the detachable labeling device may include, consist substantially of, or consist entirely of spaced apart perforations 78, spaced apart slits, or a combination thereof.

Figure 1B:
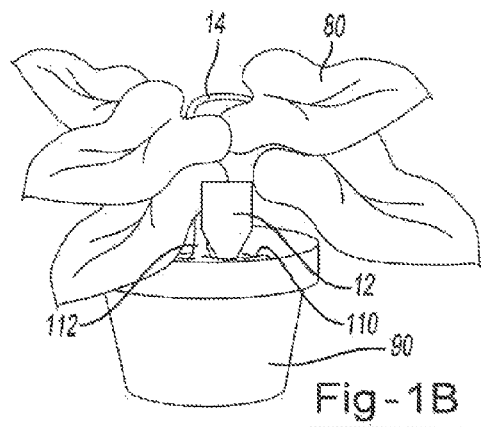
FIG. 1B is a drawing of an article with a detached labeling device of FIG. 1A positioned on or near the article.

FIG. 1B illustrates an article 14, such as an article that may be held by a container 10 according to the teachings herein. Following a step of removing the article 14 from the container 10, it may be desirable to label the article 14. This can be accomplished by detaching the detachable labeling device 12 from the container 10 and positioning it in a substrate 110 so that at least a portion of the labeling device 12 penetrates the surface of the substrate. With reference to FIG. 1B, the article 14 may be a plant 80 located in a secondary container 90, such as a pot. The secondary container 90 may hold the substrate 110, which may include, consist essentially of, or consist entirely of soil, clay, peat, pebbles, sand, mulch, or other material suitable for plant roots. As such, the use the detachable labeling device may include a step of detaching from the container 10 and staking the labeling device into soil or other substrate material 110.

Figure 2A:
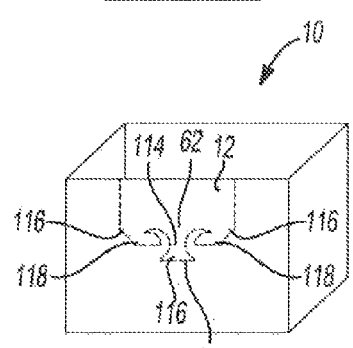
FIG. 2A is a perspective an illustrative container having one or more detachable labeling devices.
Figure 2B:
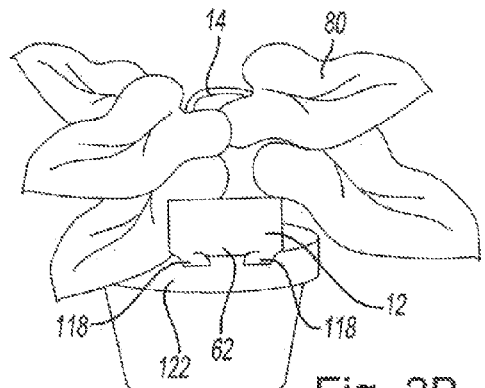
FIG. 2B is an illustrative drawing showing an article and a detached labeling device of FIG. 2A positioned on or near the article.

With reference to FIG. 2A, a container according to the teachings herein may include a detachable labeling device 12 having a securing feature 62 suitable for clipping the labeling device on or near an article. As such the securing feature 62 may include a clipping feature 114. The clipping feature may include a plurality of, and preferably includes three or more protrusions 116. For example, the clipping feature may include a pair of spaced apart protrusions 118 and a middle protrusion 120 positioned between the spaced apart protrusions 118. The protrusions should be of sufficient size, shape and position so that the labeling device remains attached to a walled surface having opposing surfaces when the two spaced apart protrusions are placed on one of the opposing, surfaces and the middle protrusion is placed on the other surface, such as illustrated in FIG. 2B. With reference to FIG. 2B, the labeling device may be clipped directly or indirectly to the article, or clipped to a location near the article.

Figure 3A:
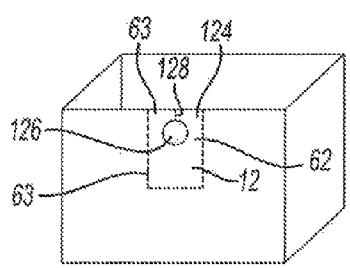
FIG. 3A is a perspective drawing of an illustrative container having one or more detachable labeling devices.
Figure 3B:
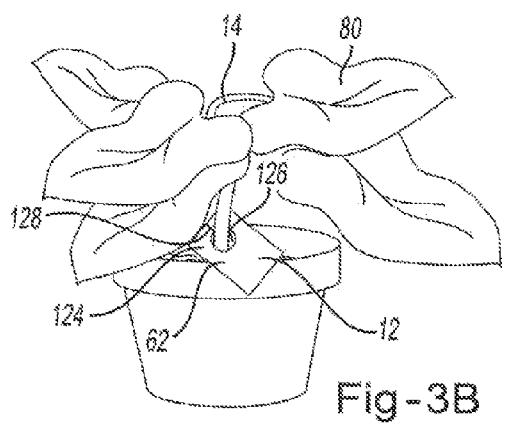
FIG. 3B is an illustrative drawing showing an article and a detached labeling device of FIG. 3A positioned on or near the article.

A detachable labeling device 12 may include a securing feature 62 that includes tagging feature 124, such as illustrated in FIGS. 3A and 3B. The tagging feature 124 may include an opening 126 and a slit 128 that extends from the opening to an edge 63 of the labeling device 12. The opening 126 preferably is sufficiently large so that the tagging feature 124 can encircle a component of the article 14, a component, attached to the article, or a component near the article. The tagging feature 124 preferably includes a single slit 128 that extends from the opening 126 to the edge 63 of the labeling device. The slit 128 may have any shape. For example, the slit 128 may have one or more regions that are straight, one or more regions that are curvilinear, or any combination thereof.

Figure 4:
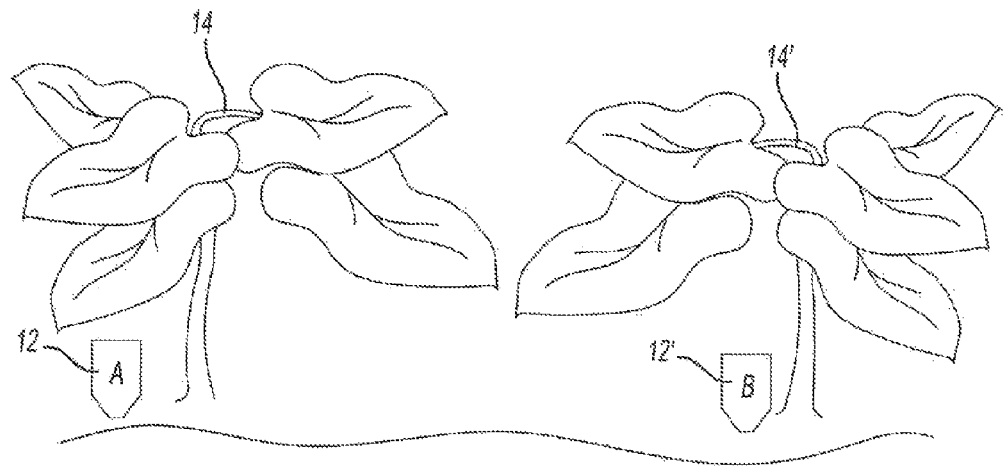
FIG. 4 is a drawing illustrating two articles each having a detached labeling device positioned on or near the article so that the articles can be distinguished.

FIG. 4 illustrates two articles (e.g., plants) that are positioned (e.g., planted same area. The articles may appear similar, but be different. For example, the articles may be different varieties of the same species of plant and may be difficult to distinguish. By placing a corresponding labeling device on or near two or more different articles, it is possible distinguish the articles despite their similar appearance.

Figure 5:
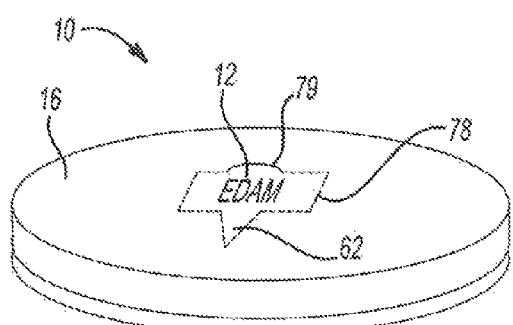
FIG. 5 is a drawing illustrating a container with one or more detachable labeling devices on a lid of the container for labeling an article in the container.

FIG. 5 illustrates a container having a top. The top may be connected to one or more walls of the container or may be a separate lid component 16. With reference to FIG. 5, an article may be enclosed entirely within a container 10. The container 10 may include one or more detachable labeling devices 12 on the lid component 16. The container may include one or more slits 79, one or more spaced apart perforations 78 or both for detaching the detachable labeling device from the container. For example, a slit 79 may be employed for grasping the detachable labeling device, for pulling the detachable labeling device away from the container, or both. If the detachable labeling device is positioned in the middle of a component of the container so that it does not share an outer periphery edge with the component, it is preferable that one or more slits of sufficient size be employed so that the detachable labeling device can be grasped and/or removed.

Figure 6:
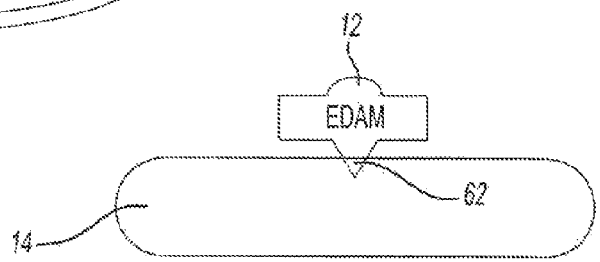
FIG. 6 is a drawing of an illustrative article having the detached labeling device of FIG. 5 attached to the article.

The detachable labeling device may be attached directly to the article 14, such as illustrated in FIG. 8. For example, the labeling device 12 may have a securing feature 62 including a tapered end 102 and the article may be sufficiently soft so that the labeling device may penetrate the surface of the article. For example, the article may be a food or food product, such as cheese, tofu, fruit, a gelatin, and the like, that is sufficiently soft so that the labeling device can that can push through the surface. As illustrated by FIG. 6, the article may support the labeling device in a generally upright orientation. The labeling device may be sufficiently rigid that it maintains a generally upright orientation.

Figure 7A:
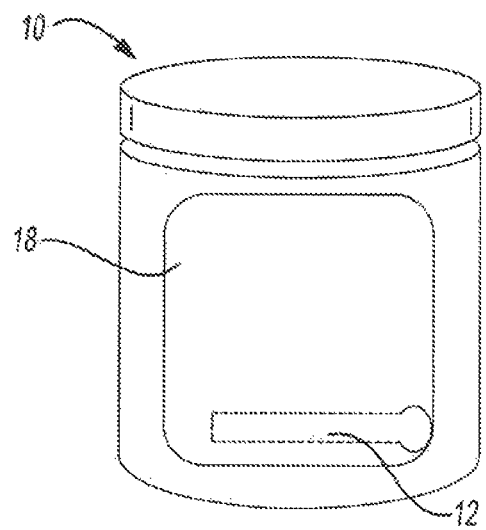
FIG. 7A is a drawing of an illustrative container for holding one or more articles and having a detachable labeling device.

FIG. 7A illustrates a container 10 having a covering 18 that includes a detachable labeling device 12. The covering 18 may cover a portion or the entirety of one or more surfaces the container 10. The detachable labeling device 12 may include one or more slits 79 sufficiently large for grasping the device, for pulling device away from the container 10 (e.g., away from the covering 18), or both.

Figure 7B:
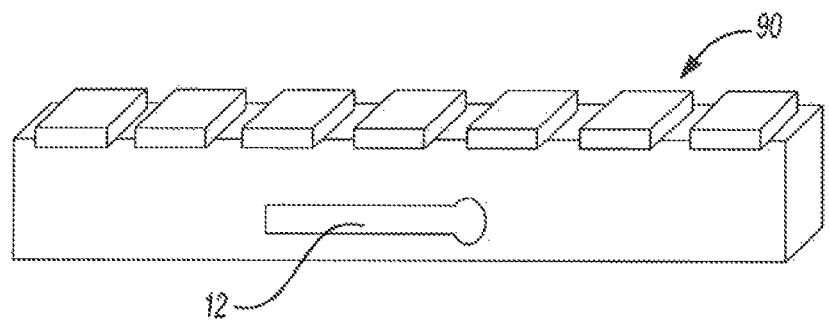
FIG. 7B is a drawing of a secondary container or holding some or all of the articles of FIG. 7A and having the detached labeling device of FIG. 7A positioned on the secondary container.

The labeling device may include a securing feature for securing to a secondary container. For example, with reference to FIG. 7B, the use of a labeling device, such as the labeling device shown in FIG. 7A, may include securing the labeling device to a secondary container 90 or compartment. The labeling device may attach to the secondary container or compartment by any securing means. For example, the labeling device may attach to the secondary container or compartment using an adhesive, using a fastener, or both. As illustrated in FIGS. 7A and 7B, a detachable labeling device may be employed for labeling articles such as a pill after it has been moved from one container to a second container. A similar approach can be used in a manufacturing environment when an ingredient is transferred from a first container to a second container. For example, the first container may be a shipping container and/or a storage container. The second container may be a hopper, a feeding system container, or simply a different (e.g., a smaller) container.

Figure 8A:
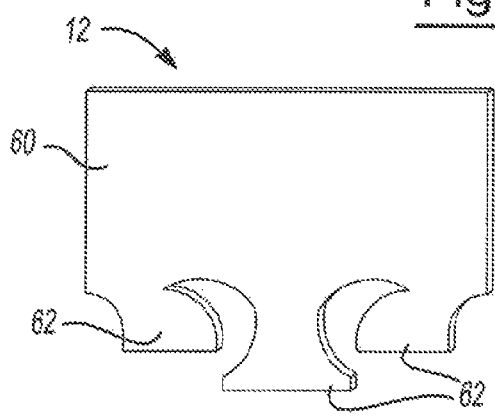
FIGS. 8A, 8B, 8C, 8D, 8E, 8F, 8G, and 8H are drawings of illustrative detached labeling devices. A labeling device may have one or any combination of the features illustrated in these figures.
Figure 8B:
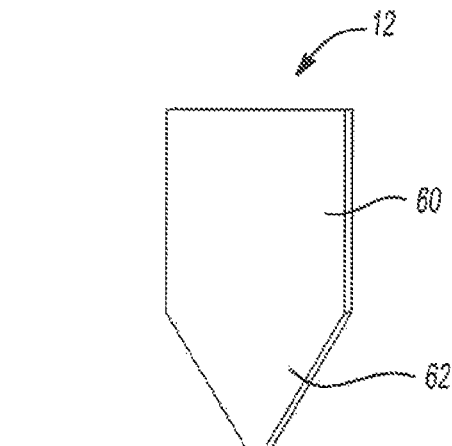
Figure 8C:
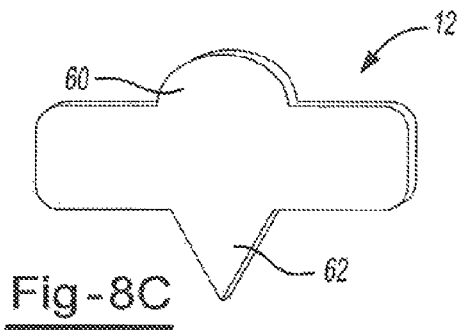
Figure 8D:
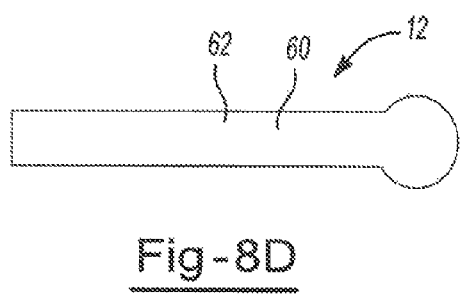
Figure 8E:
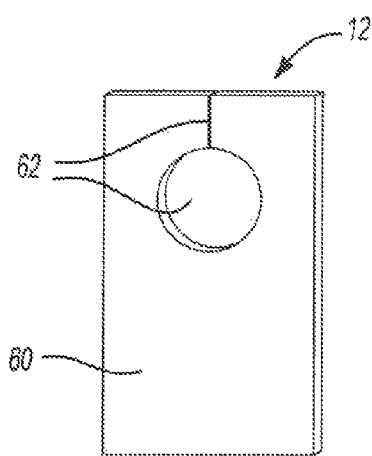
Figure 8F:
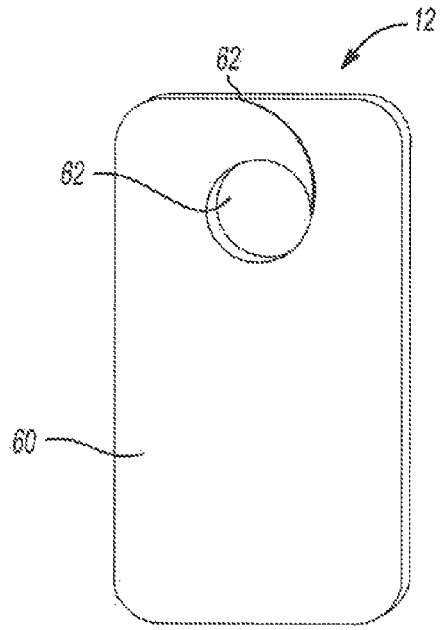
Figure 8G:
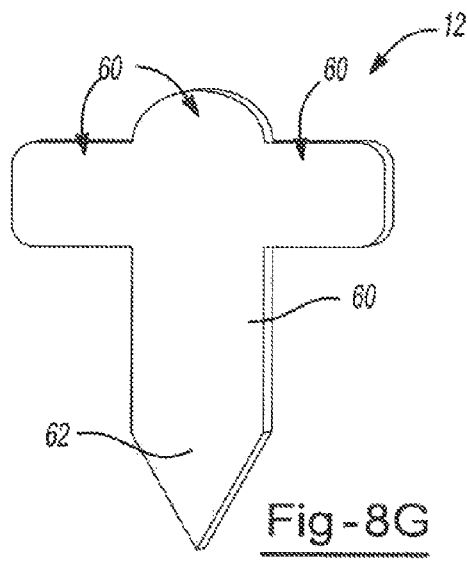
Figure 8H:
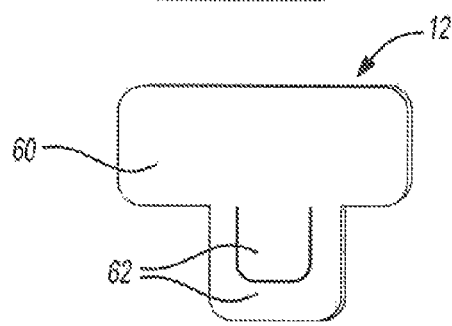

The labeling device may have any shape or size provided that the labeling device includes one or more securing features 62. Illustrative labeling devices are shown in FIGS. 8B, 8C, 8D, 8E, 8F, 8G, and 8H. The labeling device may include one or any combination of the features illustrated in these figures. The labeling device may include an opening, such as illustrated in FIGS. 8E and 8F. The labeling device may include a slit having a generally straight portion, such as illustrated in FIGS. 8E and 8F. The labeling device may include a slit having an arcuate portion, such as illustrated in FIG. 8F. A slit may extend from an opening to an outer periphery, such as illustrated in FIGS. 8E and 8F. The labeling device may include a tapered tip, such as illustrated in FIGS. 8B, 8C, and 8G. The labeling device may include a clipping feature, such as illustrated in FIGS. 8A and 8H. The labeling device preferably includes one or more labeling areas 60.

Figure 9:
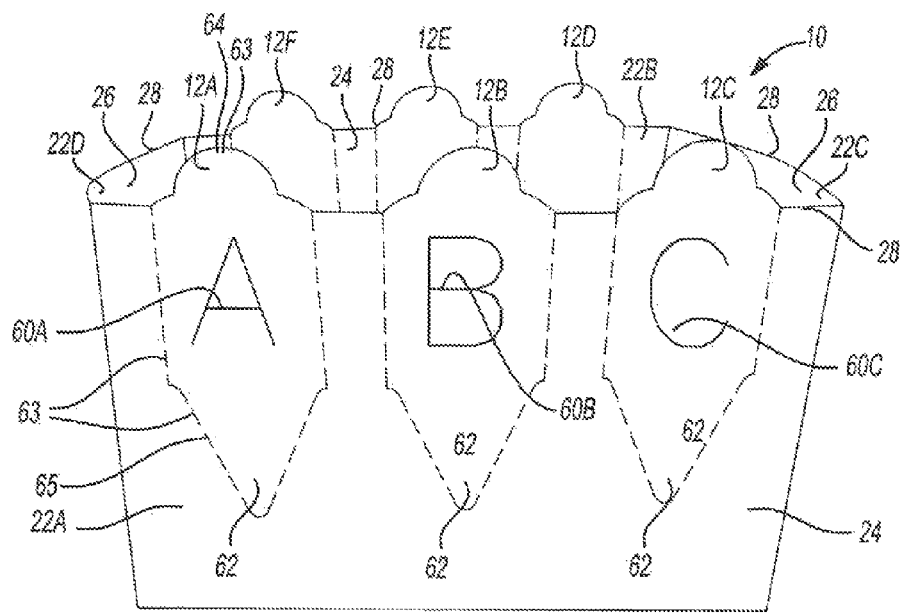
FIG. 9 is a perspective front view drawing of an illustrative container having plurality of detachable labeling devices. The container may hold a plurality of articles.

A container may include a plurality of labeling devices which may be the same or different, such as illustrated in FIG. 9. A container according to the teachings herein may have one or any combination of the features illustrated in FIG. 9. With reference to FIG. 9, one or labeling devices 12 may be located on different side walls 22 of the container 10. For example, the container 10 may include a first wall 22A having one or more labeling devices 12A, 12B, 12C and a second wall 22B (e.g., an adjacent wall or opposing wall) having one or more labeling devices 12D, 12E, 12F. As illustrated in FIG. 9, one wall 22A may include two or more labeling devices 12A, 12B, 12C, a second wall 22B may include two or more labeling devices 12D, 12E, 12F, or both. Labelling devices 12 that are different may have different information in one or more labeling areas 60, may have different shapes, may have different sizes, or any combination thereof, or both. With reference to FIG. 9, one wall may have a plurality of labeling devices 12A, 12B, 12C that have the same shape and size, but have labeling areas 60A, 60B, 60C with different information. Each labeling device 12 preferably includes a securing feature 62 which may be the same or different. Most preferably, each labeling device 12 has the same securing feature 82, such as illustrated in FIG. 9.

The container 10 may have one or more upright walls 22 having a top periphery edge 28 that is generally straight, one or more upright walls 22 having a top periphery edge 28 that is not straight, or both. With reference to FIG. 9, the container 10 may include a first pair of opposing side walls 24 having upright walls 22A, 22B having a top periphery edge that is not straight. For example, in the region of the detachable labeling device 12, the top periphery edge 28 may extend higher than, or lower than the top periphery edge of the wall in a region away from the detachable labeling device. The container 10 may include one or more walls (such as a pair of opposing walls 26, or a pair of adjacent walls) having a top periphery edge 28 that is generally straight, generally horizontal, the same elevation as another top periphery edge, or any combination thereof. Although each upright wall 22 of the container 10 may include a detachable labeling device 12, it is preferred that one or more of the upright walls is free of a detachable labeling device. The container 10 preferably is sufficiently large so that it can hold at least one article per detachable labeling device 12. For example, a container, such as the container illustrated in FIG. 9 may have 6 detachable labeling device and may be sufficiently large to hold 6 or more articles, so that each detachable labeling device 12 may be associated with one or more of the articles held in the container 10. An upright wall 22, may have any angle with the vertical direction. The angle between an upright wall and the vertical direction preferably is about 45° or less, more preferably about 30° or less, even more preferably about 20° or less, and most preferably about 15° or less. The angle between an upright wall and the vertical direction preferably may be 0° or more, preferably about 1° or more, more preferably about 2° or more, even more preferably about 3° or more, and most preferably about 5° or more. Each labeling device 12 includes one or more edges 63. The labeling device may include one or more unattached edges 64 that is not attached to another portion of the container 10. The labeling device preferably includes one or more attached edges 65 that is attached to another portion of the container 10.

Figure 10:
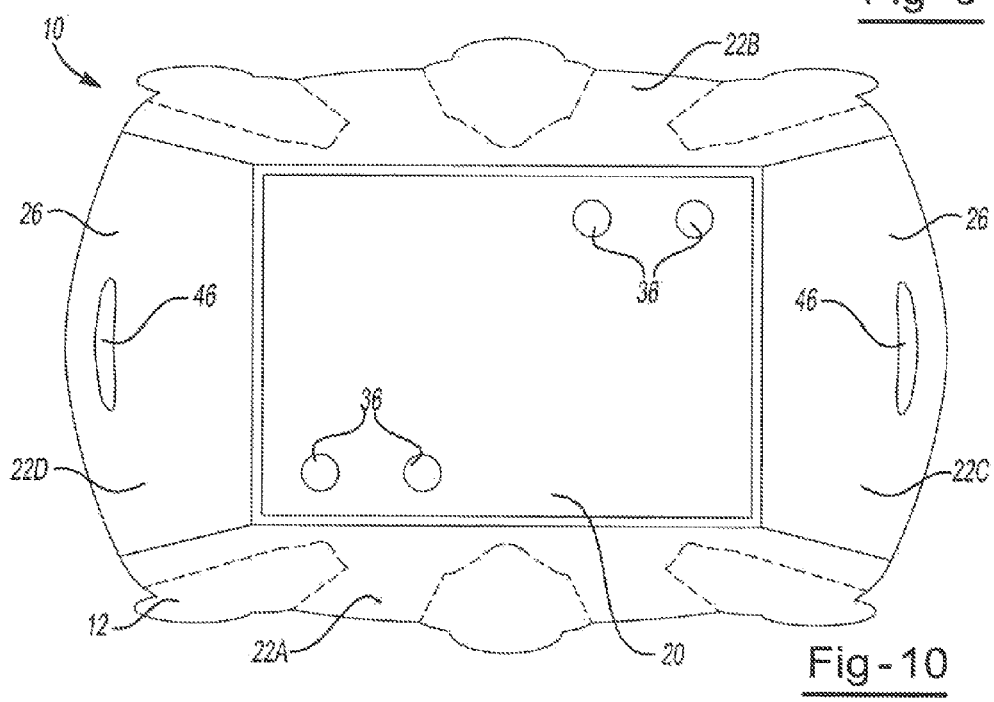
FIG. 10 is a top perspective view of an illustrative container, such as the container of FIG. 9.

FIG. 10 is an illustrative to view of a container 10, such as the container shown in FIG. 9. A container according to the teachings herein may have one or any combination of the features illustrated in FIG. 10. One or more of the upright walls of the container may include one or more wall openings 46. A wall opening 46 may be sufficiently large so that one or more fingers can be inserted into the wall opening 46 for handling the container 10. The container 10 includes a base 20. The base may include one or more base layers, including a first base layer 48. The container may include one or more base openings 36. A base opening 36 may be sufficiently large so that a fluid can drain out of the container 10. If the container 10 includes a plurality of base layers and the container includes a base opening, then two base layers may have corresponding base openings so that a fluid can drain out through the openings in both layers.

Figure 11:
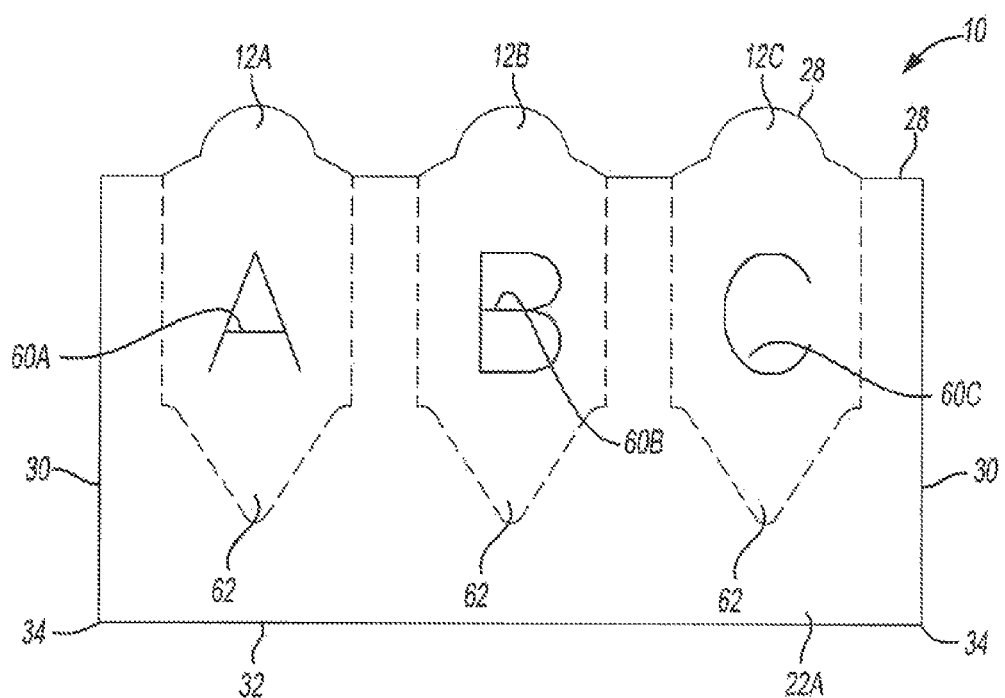
FIG. 11 is a front view of an illustrative container, such as the container of FIG. 9, according to the teachings herein showing an upright wall having one or more detachable labeling devices.

FIG. 11 is a front view of a container 10, such as the container illustrated in FIG. 9. FIG. 11 illustrates features of an upright wall 22A that may be employed. An upright wall 22A of a container according to the teachings herein may have one or any combination of the features illustrated in FIG. 11. The upright wall 22A may have opposing upright edges 30. An upright edge 30 may connect with an adjacent upright wall. Preferably the upright wall 30 includes two upright edges 30, each connected with a corresponding edge of a pair of opposing upright walls. The upright wall may have a horizontal edge 32. The horizontal edge 32 may be attached to the base of the container. For example, a base layer and an upright wall may be formed from a single blank that has been folded along the region of the horizontal edge.

Figure 12:
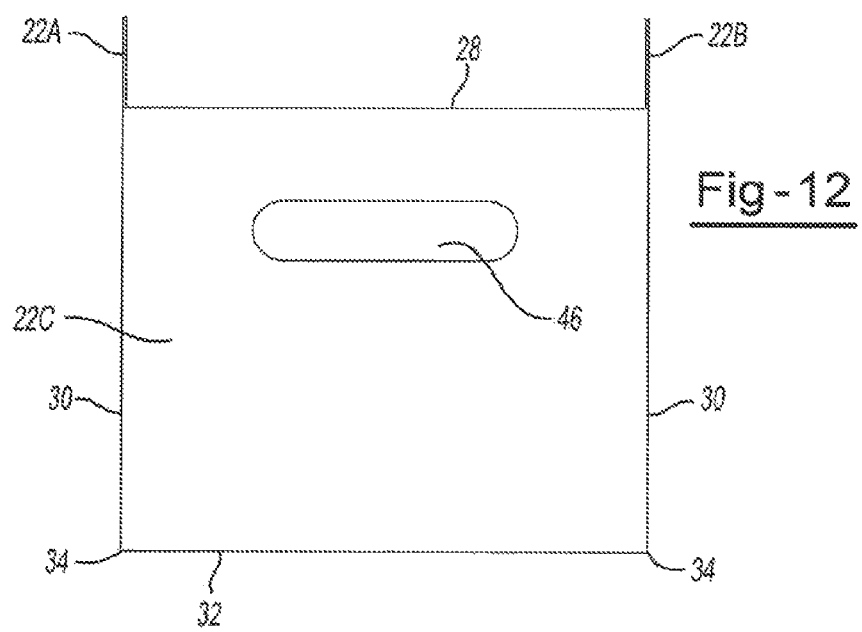
FIG. 12 is a side view of an illustrative container, such as the container of FIG. 9, according to the teachings herein showing an upright wall having no detachable labeling devices.

FIG. 12 illustrates features of an upright wall 22C that does not contain a detachable labeling device, such as a right side view of FIG. 9. An upright wall 22 of a container 10 according to the teachings herein may have one or any combination of the features illustrated in FIG. 12. The upright wall may have a top periphery edge 28 that is generally straight, generally horizontal, or both. The upright wall may have one or more wall openings 46. The upright wall preferably has two upright edges 30 and a horizontal edge 32.

Figure 13:
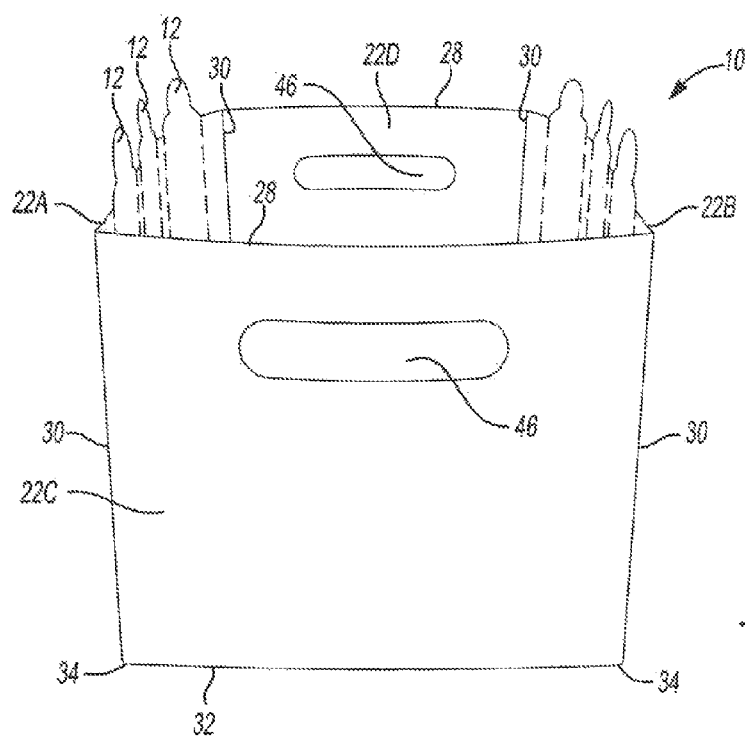
FIG. 13 is a perspective side view drawing of an illustrative container having a plurality of detachable labeling devices, such as the container of FIG. 9. The container may hold a plurality of articles.

FIG. 13 is a perspective view of a container such as from a side view of the container of FIG. 9. A container according to the teachings herein may have one or any combination of the features illustrated in FIG. 13. For example, a pair of opposing upright walls may have corresponding wall openings 46. Preferably, the wall openings are on walls that do not include a detachable labeling device. The wall openings 46 preferably are positioned above the midpoint of the walls in the vertical direction. The wall openings 46 preferably are sufficiently large and located for inserting one or more fingers into each opening for lifting and/or moving the container (e.g., when the container is holding one or more articles)

Figure 14:
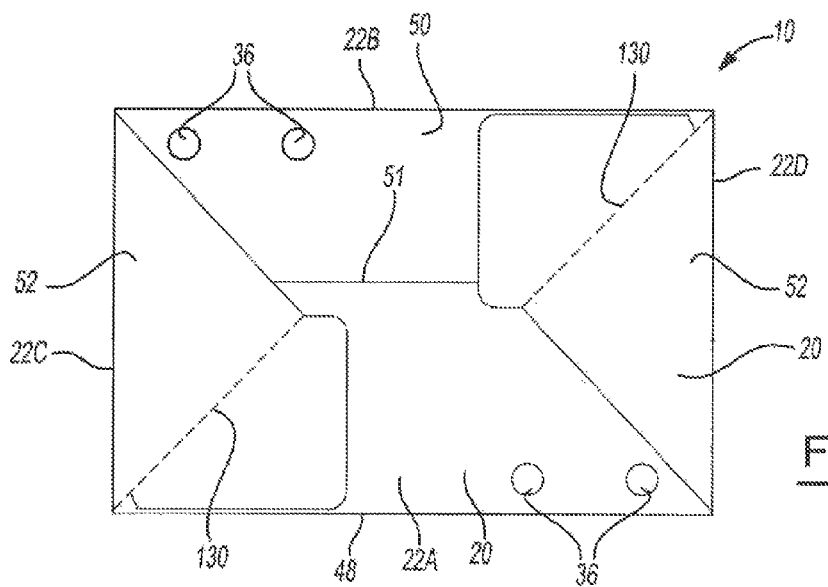
FIG. 14 is a perspective view of a bottomed of a container, such as the container of FIG. 9, having a base with one or more base layers.

FIG. 14 is a perspective view of the bottom of a container such as the container of FIG. 9. A container according to the teachings herein may have one or any combination of the features illustrated in FIG. 14. The container 10 may include a base 20 that includes one or more base layers. For example, the base layer may include a first base layer 48, a second base layer 50 or both. A base layer may extend over some or all of the base 20. By way of example, the first base layer 48 may extend over substantially the entirety of the base so that the first base layer nearly abuts or actually abuts each of the upright walls (such as illustrated in FIG. 10). A base layer may extend over only a portion of the base. By way of example, a second base layer 50 may be attached to a first upright wall, nearly abut or actually abut one or both of the adjacent upright walls, and have an edge 51 that does not reach the region close to the opposing upright wall. One or more of the base layers, and preferably each base layer is attached to an upright wall of the container. For example, the first base layer 48 and the second base layer 50 may each have an edge that is attached to an opposing upright wall 22A, 22B of the container 10. The attachment between a base layer and an upright wall may be by any means. Preferably, a base layer and an upright wall are components formed from the same blank with a fold between the two components. The container 10 may include one or more base support layers 52. A base support layer 52 may have an edge that is connected with or otherwise attached to an upright wall 22C, 22D. A base support layer 52 may be connected with or otherwise attached to an adjacent upright wall 22A, 22B, either directly or indirectly. For example a base support layer 52 may be attached to an adjacent upright wall 22A, 22B using an adhesive tape. As another example, the attachment may be indirect, such as by attaching the base support layer 52 to a base layer 48, 50 where the base layer is attached to the adjacent upright wall. An attachment between a base support layer 52 and a base layer 46, 50 may employ one or more fasteners, one or more bonding means (such as an adhesive), or any combination thereof. A base layer 48, 50 may include one or more base openings 36. If two base layers 48, 50 are stacked in a region of a base opening, it is preferable that each base, layer has a corresponding base opening 36. It will be appreciated that a base support layer 52 may also have a corresponding opening. A base support layer may have one or more dolding features 130, such as one or more creases, one or more slits, one or more perforations, one or more scores, or any combination thereof. Such a folding feature should be sufficient to allow the base support layer to be folded so that the container can be folded into a generally flat arrangement when the base support layer 52 is attached to two adjoining upright walls.

Figure 15:
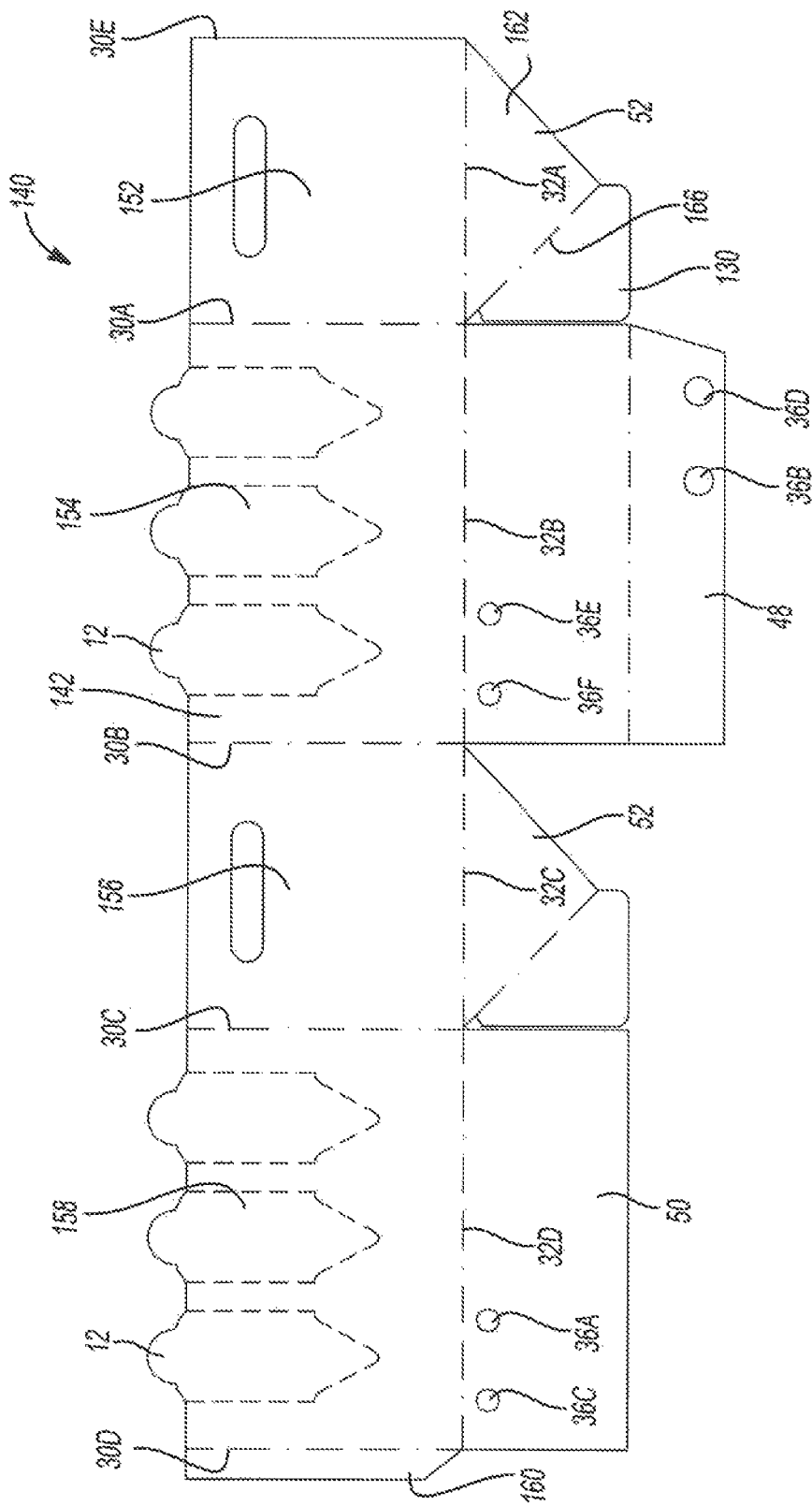
FIG. 15 is a drawing of a first surface of an illustrative blank for a container including one or more detachable labeling devices. The first surface preferably is a printed surface.
Figure 16:
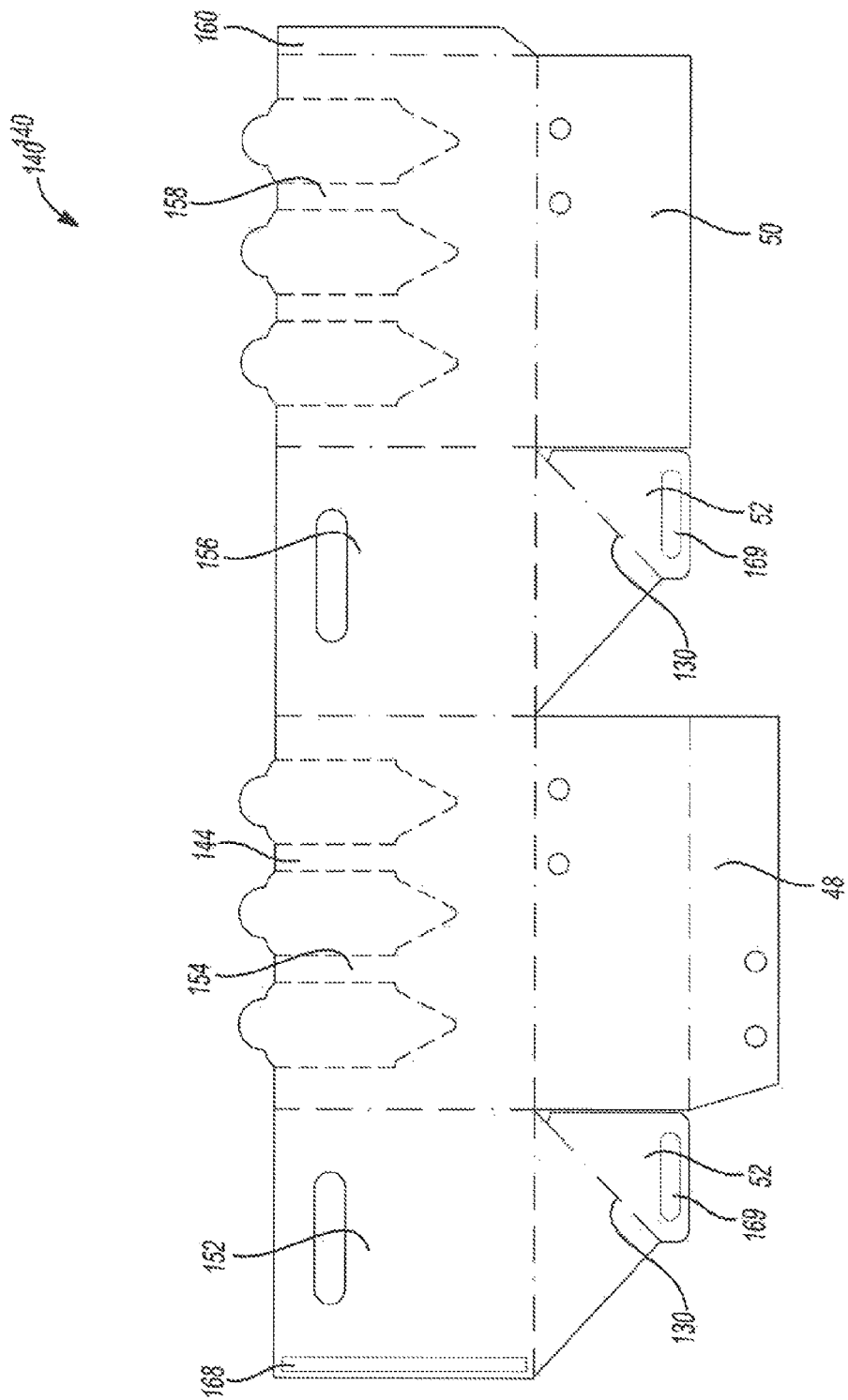
FIG. 16 is a drawing of a second surface of tan illustrative blank, such as the blank of FIG. 15, for a container including one or more detachable labeling devices. The second surface may be a printed surface, or may be free of printing.

A blank 140 for a container according to the teachings herein is illustrated in FIGS. 15 and 16. One or both surfaces of the blank may be printed. One or both surfaces of the blank may be free of printing. Preferably, the blank has a first surface 142 that is printed, such as illustrated in FIG. 15. Preferably, the blank 140 has a second surface 144 that is not printed, such as illustrated in FIG. 18. The blank 140 may have a have a plurality of wall components 150 (e.g., sections) that form upright was 22 of the assembled container 10. For example the blank may have a first wall component 152 and a second wall component 154 that share a common upright edge 30A. The blank may have a third wall component 156 and a fourth wall component 158 that shares a common upright edge 30. The second wall component and the third wall component may share a common upright edge 30B. The blank may include a wall flap 180 that shares a common edge 30D with one of the wall components (e.g., the first or fourth wall component). The wall flap 160 may include a tape, adhesive or other securing feature for attaching the wall flap 160 to the furthest upright wall component so that the furthest upright edges 30D, 30E are generally aligned. It will be appreciated that a securing feature for securing two upright walls may be applied, at any time after the blank is formed. For example, the blank may be shipped with or without the securing feature for attaching the two upright walls. One or more, or even all of the upright edges 30 between two adjacent wall components may have one or more features that facilitate the folding of the blank along the upright edge. For example, an upright edge 30A, 30B, 30C, 30D of the blank 140 may include one or more creases, one or more perforations, or both, along some or all of the edge.

One or more of the wall components may have a surface that is printed. Preferably the wall components that have labeling devices have at least one surface that is printed. For example, a wall component having a labeling device may have printing in one or more regions of the labeling device (e.g., one or more labeling areas), one or more regions outside of the labeling device, or both.

The blank 140 includes one or more base layers 48, 50, one or more base support layers 52, or both. Each base 48, 50 layer preferably shares a common horizontal edge 32B, 32D with a wall component. Each base support layer preferably shares a common horizontal edge 32A, 32C with a wall component. A horizontal edges may include a feature that facilitates folding of the blank along the edge. For example, a horizontal edge may include one or more perforations, one or more creases, one or more scores, or any combination thereof. Preferably, each wall component has a horizontal edge 32A, 32B, 32C, 32D that is shared with base layer 46, 50 or a base support layer 52.

The blank 140 may include a first base layer 48 having one or more base openings 36 and a second base layer 50 having one or more base openings. The first base layer 48 may have a base opening 36B (or 36D) that corresponds with a base opening 36A (or 36C) of the second base layer 50. Preferably none of the base openings are covered by another base layer or by a base support layer when the blank is assembled into a container. A base layer 48 may have one or more base openings 36E, 36F that are not covered by any other base layers or base support layers and thus require no additional corresponding opening (e.g., in a different base layer or in a base support layer).

The base support layer 52 may have a first region 162 that shares a common horizontal edge with a first wall component and a second region 164 for attaching to a base layer 48, 50 or to an adjacent wall component. The base support layer 52 may include one or more folding features (such as a crease, perforation, slit, score, or any combination thereof) 130 that facilitate folding the base support layer 52 between the first region and the second region.

After detaching the removable labeling portion from the container, the removable labeling portion may be placed in a fixed location.

An adhesive or other bonding means 168 may be employed for securing the flap 160 to a wall component. An adhesive or other bonding means 169 may be employed for attaching a base layer 48, 50 to a base support layer 52.

The container 10 may be collapsible so that the container can be assembled and shipped in a generally flat configuration. For example, the base layers 48, 50, and the base support layers 52 may fold into the container by folding along the folding feature 130. FIG. 17 illustrates a collapsed container 10 having a generally flat configuration.

The container according to the teachings herein may be used in a process that includes a step of detaching a detachable labeling device from the container. The process may include a step of removing an article from the container. The process may include a step of attaching the removable labeling portion to the article or to a location near the article. The process may include a step of removing two or more different articles from the container and distinguishing the two articles by attaching their respective removable labeling portions.

10 Container
12 Detachable Labeling Device
14 Article
16 Lid component of container
18 Covering of container
20 Container—base
22 Container—wall
24 Container—first pair of opposing side walls
26 Container—second pair of opposing side walls
28 Container—Peripheral Edge
30 Container—Upright Edge between two adjacent side walls
32 Container—Horizontal Edge between the base and aside wall
34 Container—Corner
36 Container—Opening in base (e.g., drain hole)
38 Container—Uncovered Top
40 Container—Region inside the container
42 Container—Region outside the container
44 Container—Outer periphery when removable portion is removed 46 Container—Opening for carrying container (e.g., hand hold)
48 Container—First base layer
50 Container—Second base layer
52 Container—Base support layer
54 Side wall flap attached to an edge of a side wall
56 Adhesive for adhering the side wall flap to an adjoining side wall
58 Adhesive for adhering a base support layer to a base layer
60 Detachable Labeling Device—labeling area
62 Detachable Labeling Device—securing feature
63 Detachable labeling device—edge
64 Detachable Labeling Device—unattached edge
66 Detachable Labeling Device—top region
68 Detachable Labeling Device—central region
70 Attachment of removable portion to an article
72 Attachment of removable portion near an article
74 Attachment of removable portion to another container holding the article
76 Detachment feature
78 Perforations
79 Slits
80 Plant
82 Cheese
84 Spices
86 Pills
88 Flags
90 Secondary Container
92 Blank for Container
94 Folded Container
96 Assembled Container
100 Kit
102 Tapered tip (attachment feature)
110 Substrate
112 Surface of the substrate
114 Clipping feature
116 Protrusions
118 Spaced apart protrusions
120 Middle protrusion
122 Wall having opposing surfaces
124 Tagging feature
126 Opening
128 Slit for a tagging feature

What is claimed is:

1. A container for holding one or more articles comprising:
a base; and
one or more generally vertical side walls suitable for maintaining at least a portion of the one or more articles within the container for a period of time;
wherein the container includes one or more labeling devices,
wherein the one or more labeling devices form part of the one or more generally vertical side walls and are completely detachable from the container, and the one or more labeling devices are each structurally self-defined so that some or all of the one or more labeling devices can be attached to or substantially fixedly positioned relative to the one or more articles to label the one or more articles after the one or more articles are removed from the container.

2. The container of claim 1, wherein
the base is suitable for supporting the one or more articles; and
the container includes four side walls.

3. The container of claim 2, wherein the container includes a plurality of labeling devices.

4. The container of claim 3, wherein the one or more labeling devices include different labeling devices for distinguish different varieties of a same species of plants.

5. The container of claim 3, wherein the container includes the plurality of labeling devices being located at two or more of the generally vertical side walls of the container; the container includes perforations for detaching the one or more labeling devices from the container; and the base of the container includes at least two base layers that are folded from a continuous single sheet.

6. The container of claim 5, wherein the base includes one or more openings so that a liquid can flow by gravity from the inside of the container, through the one or more openings to a location exterior of the container.

7. The container of claim 6, wherein the container includes adhesive bonds for attaching a base layer to an adjacent base support layer; and two or more of the side walls include openings sufficient for handholds for carrying the container.

8. The container of claim 3, wherein the one or more labeling devices include a first labeling device and a second labeling device that is different from the first labeling device, so that the labeling devices can be used for articles that are different.

9. The container of claim 3, wherein the container is suitable for holding a plurality of articles.

10. The container of claim 2, wherein the container includes
a) the base having a generally rectangular shape and having a first pair of peripheral edges and a second pair of peripheral edges;
b) the one or more generally vertical side walls comprising:
1) a first pair of opposing spaced apart side walls each projecting generally orthogonally from respective edges of the first pair of peripheral edges; and
2) a second pair of opposing spaced apart side walls each projecting generally orthogonally from respective edges of the second pair of peripheral edges;
wherein intersections of the base with the first pair of opposing spaced apart side walls and the second pair of opposing spaced apart side walls define four corners of the container.

11. The container of claim 10, wherein the base and the side walls are constructed from a continuous single sheet; and the base includes two or more layers of the single sheet that are folded from the continuous single sheet.

12. The container of claim 11, wherein the one or more articles are plants.

13. The container of claim 1, wherein the one or more labeling devices include a securing feature suitable for attaching the one or more labeling devices to one of the one or more articles or near one of the one or more articles.

14. The container of claim 1, wherein the container includes perforations for detaching the one or more labeling devices.

15. The container of claim 1, wherein the one or more labeling devices are sufficiently rigid and include a taper so that the one or more labeling devices can be planted in a particulate substrate.

16. The container of claim 1, wherein the one or more labeling devices are part of a side wall of the container.

17. A process for using, the container of claim 1, wherein the process includes a step of detaching one of the one or more labeling devices from the container; wherein the process includes one or any combination of the following:
removing an article from the container;
attaching the one labeling device to the article;
positioning the one labeling device near the article;

placing the article in a secondary container; or attaching the one labeling device to the secondary container.

18. A die cut paperboard preform for the container of claim 1.

19. A kit comprising:

the container of claim 1; and one or more articles; wherein i. the one or more articles are at least partially located in the container; and ii. the one or more labeling devices of the container respectfully describe one or more features of the one or more articles.

20. The kit of claim 19, wherein the one or more articles are arranged in the container so that each article is associated with one of the one or more labeling devices.

\* \* \* \* \*